United States Patent
Bishop

[11] Patent Number: 5,906,493
[45] Date of Patent: May 25, 1999

[54] FIREFIGHTER TRAINING DOOR DEVICE

[76] Inventor: Michael Bishop, 64-19 65th St., Middle Village, N.Y. 11379

[21] Appl. No.: 09/001,932

[22] Filed: Dec. 31, 1997

[51] Int. Cl.[6] .................................................. G09B 19/00
[52] U.S. Cl. .......................... 434/226; 292/357; 49/141; 49/394; 49/503; 70/465
[58] Field of Search .............................. 434/226; 49/141, 49/503, 394; 70/465, 467; 292/341.16, 357; 414/684.3

[56] References Cited

U.S. PATENT DOCUMENTS

| | | | |
|---|---|---|---|
| 4,001,949 | 1/1977 | Francis | 35/10 |
| 5,203,707 | 4/1993 | Musto | 434/226 |
| 5,316,484 | 5/1994 | Layton | 434/226 |
| 5,562,314 | 10/1996 | Wheatland et al. | 292/1.5 |

*Primary Examiner*—Jessica J. Harrison
*Assistant Examiner*—David A. Fleming
*Attorney, Agent, or Firm*—Goldstein & Canino

[57] ABSTRACT

A training device, for mounting to a standard door having a cutout at middle height, the door mounted in a door frame having a strike plate at middle height. A sliding box is mounted in the cutout for slidable motion toward and away from the strike plate. At least one spring is mounted between the sliding box and the cutout for biasing the sliding box toward the strike plate. The spring is selected to resist compression and thus motion of the sliding box away from the strike plate. The amount of resistance that the spring provides is equivalent to the amount of resistance presented by a doorknob and locking assembly on standard doors. Thus, a crowbar-like tool may be used to pry the sliding box away from the strike plate to open the door and simulate the force and action necessary to pry open any standard door.

6 Claims, 5 Drawing Sheets

FIREFIGHTER TRAINING DOOR DEVICE

BACKGROUND OF THE INVENTION

The invention relates to a firefighter training device. More particularly, the invention relates to a device specifically designed to demonstrate to a firefighter the proper technique for prying open a typical locked door.

In order to most effectively fight a fire in a burning building, a firefighter needs access to various points around the fire. In addition, one of the primary tasks of a firefighter to ensure that no occupants remain trapped, injured, or unconscious in the building. However, often locked doors stand in the way of properly fighting the fire, or fully inspecting a building to ensure that no one has remained inside.

Various firefighter training regiments are time honored, and are necessary to ensure that a firefighter is best equipped to deal with any situation that may be encountered in the field. Thus, firefighter training not only involves the teaching of rescue skills, but also involves teaching practical skills well known by any veteran firefighter—such as how to gain access to an otherwise locked building structure. Gaining access to a locked building involves a variety of techniques, from breaking a window with an ax, to prying open a door with a crowbar-like tool known as a "Haligan tool".

Training a fledgling firefighter to use a "Haligan tool" generally involves practicing the act of prying open a locked open. However, very often the door is ruined by this attempt, especially when the students try for the first time. Thus, many doors are ruined during the training exercises.

Various devices are available to enhance other aspects of firefighter training. While these units may be suitable for the particular purpose employed, or for general use, they would not be as suitable for the purposes of the present invention as disclosed hereafter.

SUMMARY OF THE INVENTION

It is an object of the invention to produce a training device which teaches a firefighter how to pry open a locked door. The invention installs into a standard door, replacing the lock mechanism, and simulates the response of the lock mechanism to a prying action. The invention includes a sliding assembly which slides a small distance laterally away from the strike plate when properly pryed.

It is another object of the invention to provide a training device which closely emulates the resistance presented by a lock mechanism of a standard door. The invention includes one or more springs that are positioned adjacent to the sliding assembly to resist lateral movement of the sliding assembly.

It is a further object of the invention that the resistance is adjustable to simulate different doors. The spring tension may be adjusted, and the springs may be replaced to provide suitable resistance.

The invention is a training device, for mounting to a standard door having a cutout at middle height, the door mounted in a door frame having a strike plate at middle height. A sliding box is mounted in the cutout for slidable motion toward and away from the strike plate. At least one spring is mounted between the sliding box and the cutout for biasing the sliding box toward the strike plate. The spring is selected to resist compression and thus motion of the sliding box away from the strike plate. The amount of resistance that the spring provides is equivalent to the amount of resistance presented by a doorknob and locking assembly on standard doors. Thus, a crowbar-like tool may be used to pry the sliding box away from the strike plate to open the door and simulate the force and action necessary to pry open any standard door.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
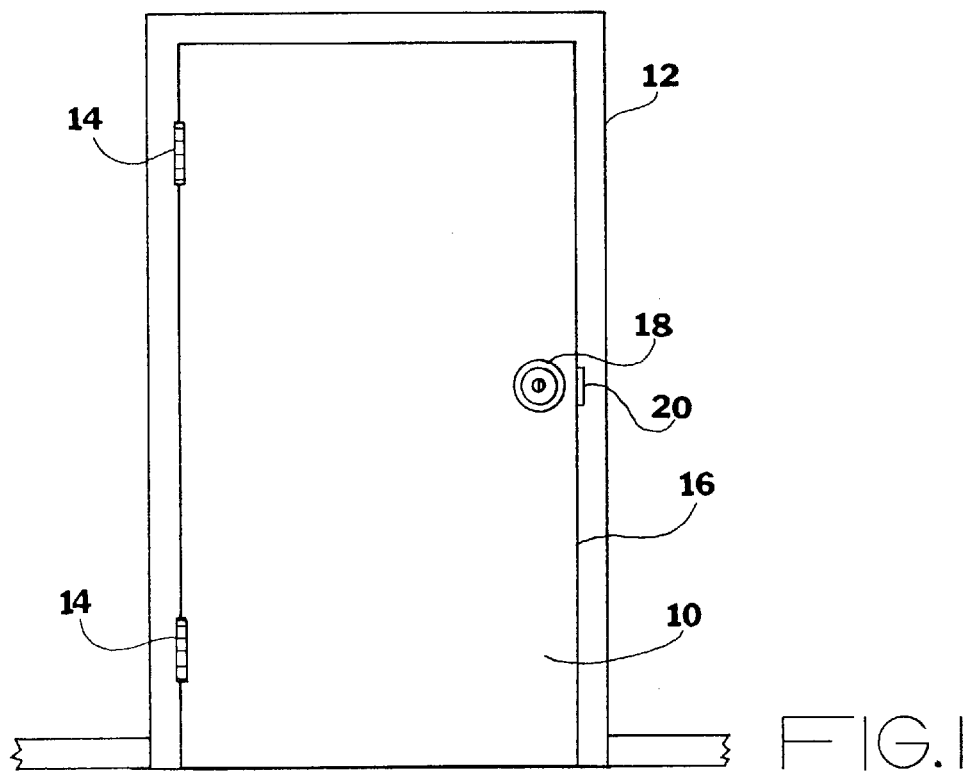
FIG. 1 is a front elevational view, illustrating a standard door.

FIG. 1 illustrates a standard door 10 and door frame 12. The door is mounted to the door frame 12 with hinges 14. An inside edge 16 of the door 10 is opposite the hinges 14. A lock and doorknob assembly 18 is located on the door 10 at middle height near the inside edge 16, which is actually slightly below the middle of the door, but which more specifically refers to the height of the lock and doorknob assembly on any standard door. A strike plate 20 is mounted to the door frame 12 adjacent to the lock and doorknob assembly 18, for cooperating with the lock and doorknob assembly 18 to latch and lock the door. To pry open a locked door of the type illustrated, a tool is inserted between the inside edge 16 and the strike plate 20 to provide enough clearance for the lock and doorknob assembly to unlatch from the strike plate 20.

Figure 2:
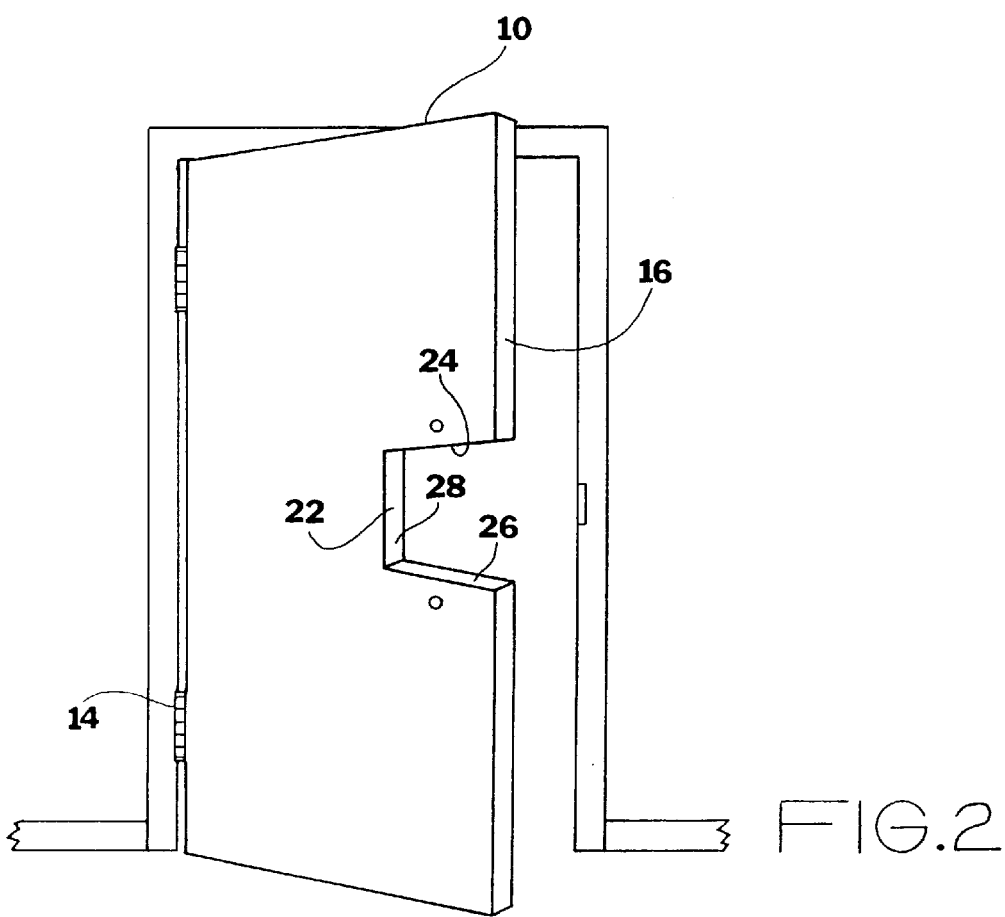
FIG. 2 is a front elevational view, illustrating a door, wherein a cutout has been made, and holes have been drilled to allow installation of the invention.

FIG. 2 illustrates the door 10, which has been prepared for installation of the invention by providing a cutout 22 extending from the inside edge 16 toward the hinge 14, for a distance known as a cutout depth. The cutout 22 is at middle height on the door. The cutout 22 has a cutout upper edge 24, a cutout lower edge 26, and a cutout back edge 28.

Figure 3:
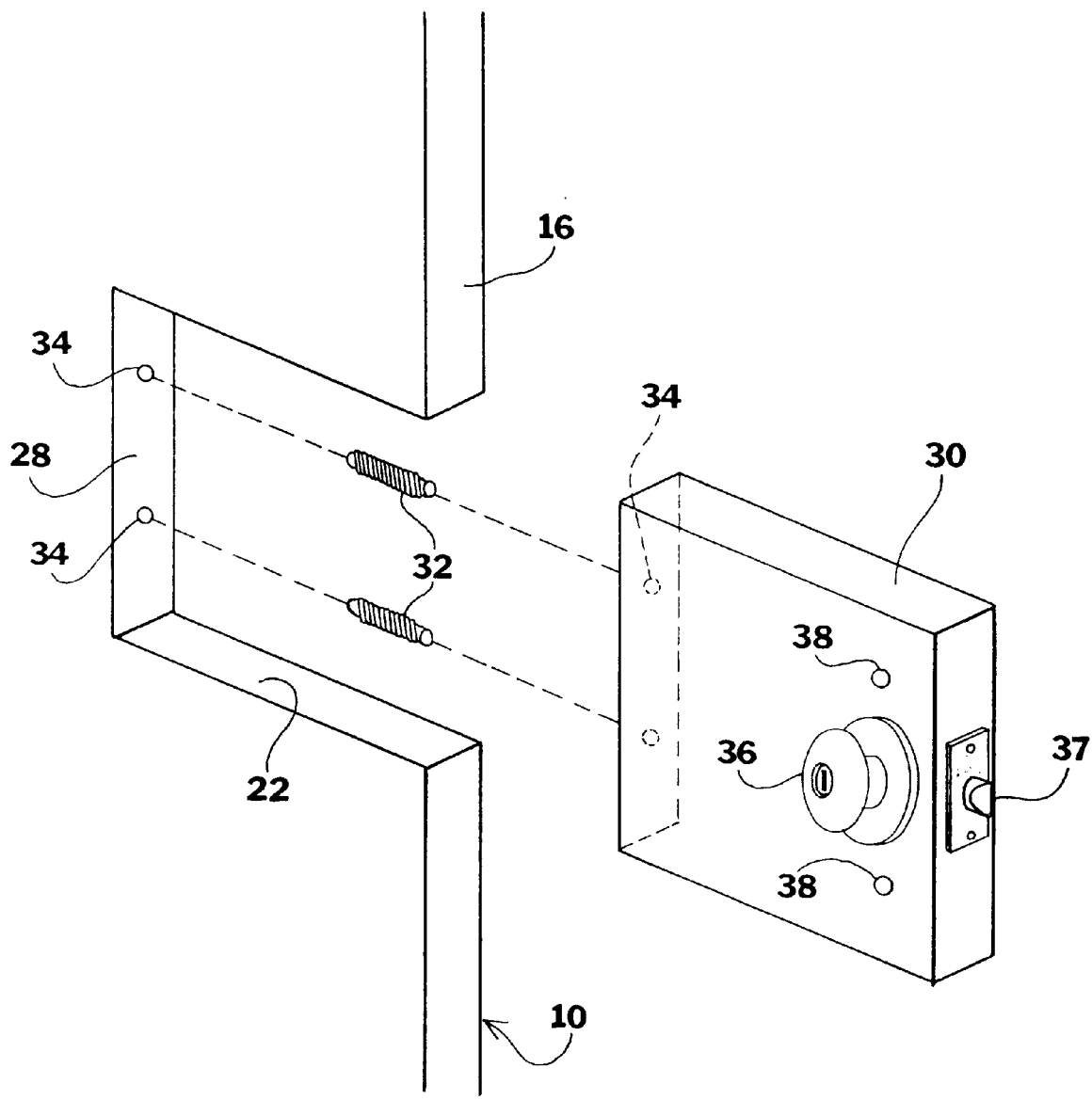
FIG. 3 is an assembly drawing, illustrating the sliding box being mounted in the cutout, with a pair of springs installed between the sliding box and cutout.

Illustrated in FIG. 3, a sliding box 30 is provided to fit within the cutout 22. Also illustrated in FIG. 3, a pair of springs 32 are mounted between the sliding box 30 and the cutout back edge 28. The springs 32 are seated in spring mounting holes 34 that are present on both the cutout back edge 28 and the sliding box 30. The springs 32 bias the sliding box 30 toward the inside edge 16 of the door 10. The sliding box 30 features a mock door knob 36 and a mock latch 37 which is located on the sliding box 30 where the lock and doorknob assembly would be mounted on a standard door 10. The sliding box 30 also has a pair of guide holes 38 which extend fully through the sliding box 30 .

Figure 4:
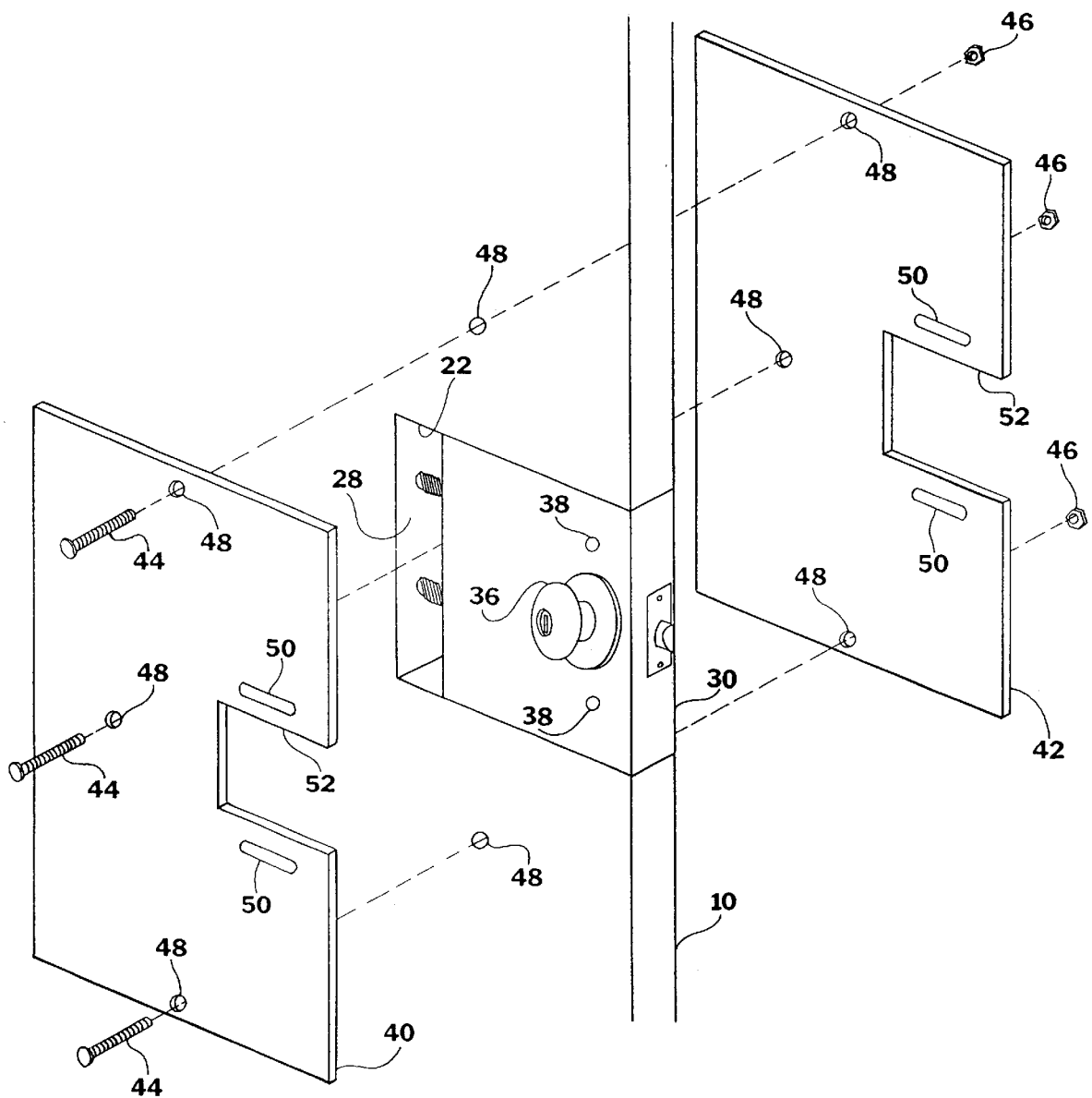
FIG. 4 is an assembly drawing, illustrating the front and rear cover plates being installed over the door and sliding box, and being secured in place with bolts.

Referring to FIG. 4, a front plate 40 and a back plate 42 are mounted to opposite sides of the door 10 over the cutout 22, sandwiching the sliding box 30 in the cutout 22. The front plate 40 and back plate 42 are mounted to the door 10 with a plurality of mounting bolts 44, which are fastened with mounting nuts 46. The mounting bolts 44 extend through mounting holes 48 which are present in a matching pattern on both the front plate 40 and back plate 42. The mounting holes 48 are also present on the door 10 to match the pattern on the front plate 40 and back plate 42. However, as illustrated, one or more of the mounting bolts 44 can extend directly between the front plate 40 and back plate 42, by extending between the cutout back edge 28 and the sliding box 30.

The front plate 40 and back plate 42 each have a pair of guide slots 50, and a knob indent 52 for accommodating the mock door knob 36 and avoiding interference between the mock door knob 36 and the front plate 40 and back plate 42 which might limit motion of the sliding box 30. The guide holes on the sliding box 30 correspond with the guide slots 50 when the front plate 40 and back plate 42 are mounted to the door 10.

Figure 5:
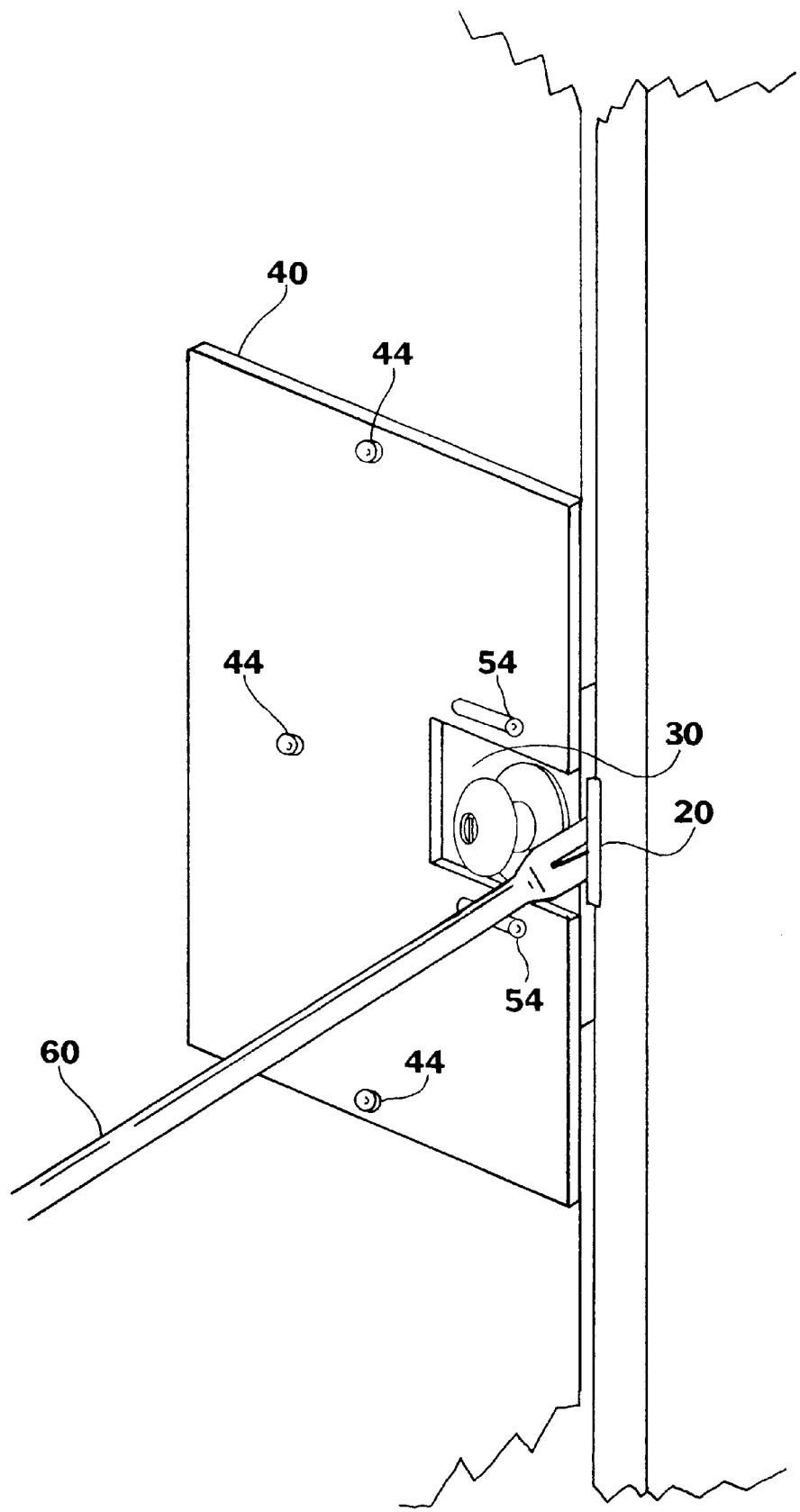
FIG. 5 is a diagrammatic perspective view, illustrating a tool being applied to the fully installed invention.

Referring to FIG. 5, the front plate 40 and back plate 42 have been installed onto the door 10 with the mounting bolts 44. Guide bolts 54 have been inserted through the guide slots 50 and through the guide holes 38 in the sliding box 30. The guide slots 50 limit the lateral travel of the sliding box 30 toward and away from the strike plate. The sliding box 30 is exerting a force against the strike plate 20 under a decompressive force exerted by the springs, engaging the mock latch 37 with the strike plate.

Illustrated in FIG. 5, a "haligan" tool or crowbar 60 is being inserted between the sliding box 30 and strike plate. The application of said tool in FIG. 5 and FIG. 6 is shown not for purposes of illustrating proper use of said tool, but for purpose of demonstrating operation of the invention.

Figure 6:
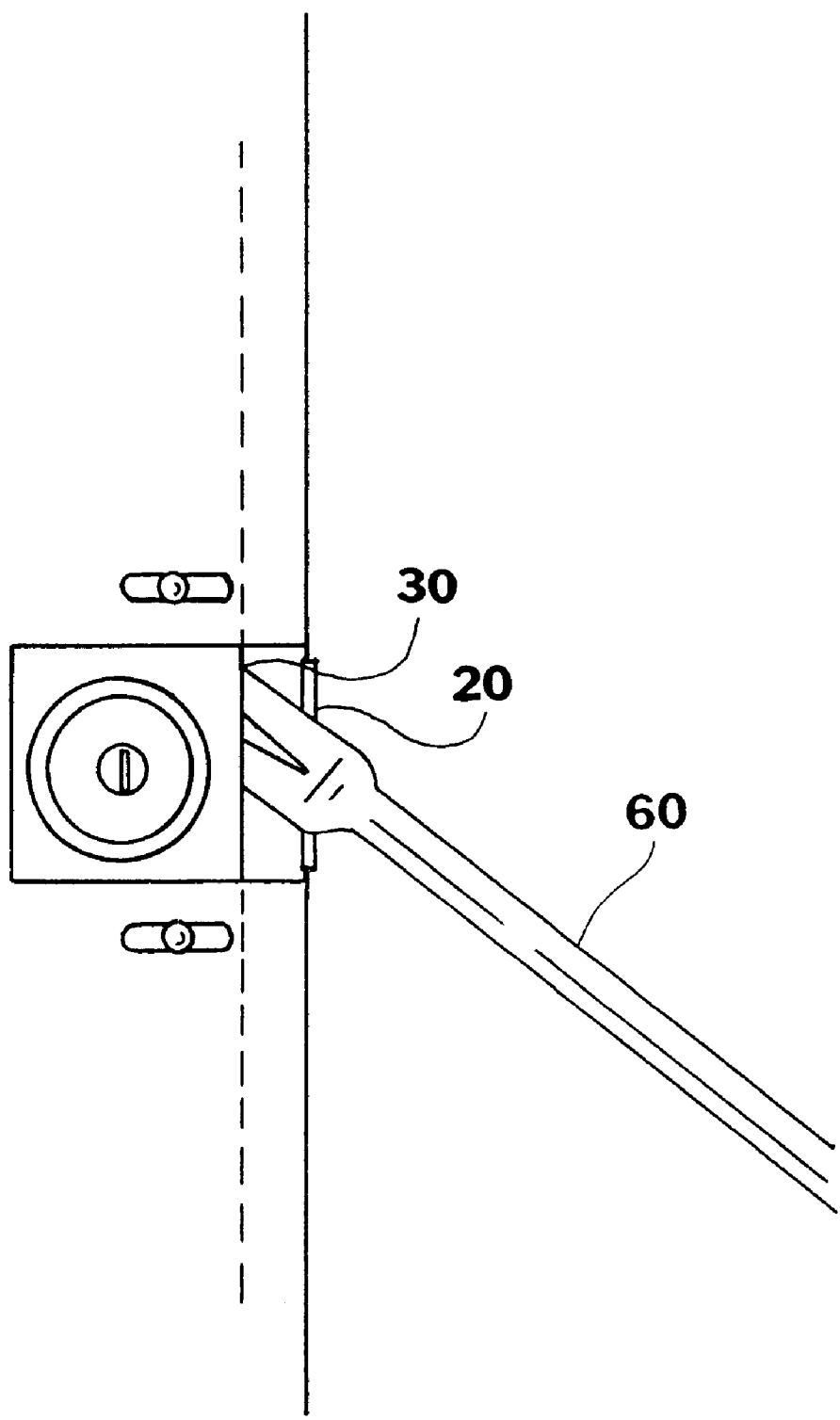
FIG. 6 is a front elevational view, wherein the tool has pryed the sliding box away from the strike plate.

In FIG. 6, the crowbar 60 has been used to pry the sliding box 30 from the strike plate 20. The springs have been compressed, and have exerted resistance to said compression which mimics the resistance offered by the locking assembly on a standard door. With the force exerted by the sliding box against the strike plate relieved, and the mock latch 37 cleared of the strike plate, the door may be urged open with the crowbar 60.

It should be further noted that the springs may be interchanged to simulate different doors and locking mechanisms. Since different locking mechanisms require different amounts of force before they are overcome, varying the springs makes the exercise more challenging to the trainee. Such varyance also trains the fledgling firefighter to get a feel for the proper amount of force necessary under a given set of circumstances.

In conclusion, herein is presented a training device which allows for proper demonstration of the techniques necessary for prying open a locked door. The device includes a sliding box assembly which offers resistance to opening, but which can be overcome in a similar manner and with similar force that a conventional door can be pryed open. The sliding box is not damaged when pryed open, thus the training device can be used over and over.

What is claimed is:

1. A training device, for training the technique of opening a conventional locked door which has a lock and doorknob assembly, comprising:

a standard door having an inner edge and a cutout at middle height extending into the standard door from the inner edge;

a door frame having a strike plate at middle height;

a sliding box slidably mounted within the cutout adjacent the strike plate for slidable motion toward and away from the strike plate, the sliding box having a mock door latch which selectively engages the strike plate as the sliding box moves toward the strike plate;

a spring means between the sliding box and the cutout, biasing the sliding box against the strike plate such that the sliding box may be pryed away from the strike plate using similar force as would be required to pry the lock and doorknob assembly of the conventional locked door from the strike plate to open said door.

2. The training device as recited in claim 1, further comprising a front plate and back plate which mount to the door, sandwiching the sliding box therebetween.

3. The training device as recited in claim 2, wherein:

the front plate and back plate further each comprise at least one guide slot;

the sliding box comprises at least one guide hole which corresponds with the guide slots when the front plate and back plate are mounted to the standard door; and a guide bolt extends through the guide slots and through the guide hole such that the guide slot limits the lateral motion of the sliding box by interfering with lateral motion of the guide bolt beyond the guide slot.

4. The training device as recited in claim 3, wherein the cutout has a back edge, wherein the cutout back edge and the sliding box both have spring mounting holes; and wherein the spring means further comprises a pair of springs which are seated in the spring mounting holes to bias the sliding box toward the inner edge of the door.

5. The training device as recited in claim 4, wherein the sliding box further comprises a mock door knob.

6. The training device as recited in claim 5, wherein at least one of the front plate and back plate have a knob indent for accommodating the mock knob and preventing interference between the mock knob and the front plate and back plate which might limit motion of the sliding box.

* * * * *